United States Patent
Shin et al.

(10) Patent No.: US 9,936,476 B2
(45) Date of Patent: *Apr. 3, 2018

(54) SYSTEM AND METHOD FOR PROVIDING SOCIAL NETWORK SERVICE AND FOR SETTING RELATIONSHIP BETWEEN USERS

(71) Applicant: LINE CORPORATION, Tokyo (JP)

(72) Inventors: JungHo Shin, Seongnam-si (KR); Seong Hoon Kim, Seongnam-si (KR); Jungmin Lee, Seongnam-si (KR); Bo Yoon Choi, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 14/972,335

(22) Filed: Dec. 17, 2015

(65) Prior Publication Data
US 2016/0105867 A1    Apr. 14, 2016

Related U.S. Application Data

(63) Continuation of application No. 13/599,386, filed on Aug. 30, 2012, now Pat. No. 9,560,618.

(30) Foreign Application Priority Data

Aug. 31, 2011   (KR) .................... 10-2011-0087568

(51) Int. Cl.
*H04W 64/00*   (2009.01)
*H04L 29/08*   (2006.01)
(Continued)

(52) U.S. Cl.
CPC ............. *H04W 64/00* (2013.01); *H04L 51/32* (2013.01); *H04L 67/10* (2013.01); *H04W 4/021* (2013.01)

(58) Field of Classification Search
CPC ........ H04L 51/32; H04L 67/10; H04W 64/00; H04W 4/021
See application file for complete search history.

(56) References Cited

U.S. PATENT DOCUMENTS 7,532,196 B2 *   5/2009   Hinckley ................ G06F 3/011
                                                    345/156
8,380,804 B2 *   2/2013   Jain ...................... G06Q 10/109
                                                    709/207

(Continued)

FOREIGN PATENT DOCUMENTS

JP       2003-174519     6/2003
JP       2010-141578     6/2010
(Continued)

OTHER PUBLICATIONS

Narekata (the nickname of the author of the blog) : "Optimus Z, 'Stylish Smart Phone' being able to change Life Style" pp. 6, Aug. 1, 2010, Korea, The Internet <URL: http://blog.naver.com/PostView.nhn?blogId=narekata&logNo=20110786802>, with English Abstract.

(Continued)

*Primary Examiner* — Abdullahi E Salad
(74) *Attorney, Agent, or Firm* — IPUSA, PLLC

(57) ABSTRACT

A user terminal connected to a system to provide social network service (SNS) includes a transmission unit configured to send a friend request and location information of the user terminal, and receive user information of at least one other user terminals, and a display control unit configured to control a display of the user terminal to display a current location of a user of the user terminal and the user information of the at least one other user terminal present within a predetermined distance based on received location information of the other user terminal. Within the display control (Continued)

unit, a particular region of the display is set as a current location of the user terminal.

24 Claims, 13 Drawing Sheets

(51) Int. Cl.
  *H04W 4/02* (2018.01)
  *H04L 12/58* (2006.01)

(56) References Cited

U.S. PATENT DOCUMENTS

| | | | | |
|---|---|---|---|---|
| 8,745,250 B2* | 6/2014 | Shah | ............ | H04W 4/02 |
| | | | | 455/456.3 |
| 2008/0233996 A1* | 9/2008 | Ogasawara | ............ | G06F 3/017 |
| | | | | 455/550.1 |
| 2011/0142016 A1* | 6/2011 | Chatterjee | ............ | G06Q 30/02 |
| | | | | 370/338 |
| 2011/0314168 A1* | 12/2011 | Bathiche | ............ | H04W 4/206 |
| | | | | 709/228 |
| 2012/0022930 A1 | 1/2012 | Brouhard | | |
| 2012/0215610 A1* | 8/2012 | Amaro | ............ | G06Q 30/02 |
| | | | | 705/14.23 |
| 2014/0162698 A1* | 6/2014 | Han | ............ | H04W 4/00 |
| | | | | 455/456.3 |

FOREIGN PATENT DOCUMENTS

| | | |
|---|---|---|
| KR | 10-2003-0042063 | 5/2003 |
| KR | 10-2005-0101624 | 10/2005 |
| KR | 10-0888632 | 3/2009 |
| KR | 10-2010-0045312 | 5/2010 |
| KR | 10-2011-0023255 | 3/2011 |

OTHER PUBLICATIONS

Surinara (the nickname of the author of the blog) : "[Application recommendation for iPhone] Let's use bump application instead of bluetooth" pp. 4, Jul. 21, 2011, Korea, The Internet <URL: http://blog.daum.net/jenny0002/42> with English Abstract.
Korean Office Action dated Dec. 2, 2014.
Korean Office Action dated Jun. 23, 2015.
Korean Office Action dated Dec. 23, 2015.
U.S. Office Action dated May 20, 2016.
Korean Office Action dated Jul. 8, 2014.
Japanese Office Action dated Apr. 30, 2013.
NHN Corporation, me2dayHELP "Becoming me2 friends with each other by shaking their smartphones", [online] Apr. 27, 2011 NHN Corporation, the Internet <URL: http://me2day.net/me2/blog/posts/py19rz4-fzr>, with English concise explanation.

* cited by examiner

SYSTEM AND METHOD FOR PROVIDING SOCIAL NETWORK SERVICE AND FOR SETTING RELATIONSHIP BETWEEN USERS

CROSS-REFERENCE TO RELATED APPLICATION

This application is a continuation patent application of, and claims the benefit of and priority to U.S. patent application Ser. No. 13/599,386 filed on Aug. 30, 2012, which is based on and claims the benefit of priority of Korean Patent Application No. 10-2011-0087568, filed on Aug. 31, 2011 with the Korean Patent Office, the entire contents of which are hereby incorporated by reference.

BACKGROUND OF THE INVENTION

1. Field of the Invention

Exemplary embodiments of the present invention relate to a system and method for providing social network service and for setting relationships between users of mobile terminals.

2. Description of the Related Art

In a conventional method for establishing relationships between users, a user may need to access a server through his or her user terminal, input information on another user that the user wishes to build a relationship with as an online friend, for example, a telephone number or an identification (ID), through the user terminal, and send the information to the server. The server subsequently requests the other user to confirm acceptance of the relationship using the information on the other user and sets the relationship between the users based on a result of the request.

That is, the user may need to undertake a series of processes, such as accessing the server for provision of the information on the other user that the user wishes to set a relationship with and the server searching for the other user for acceptance, causing an inconvenience and involving costs and a great amount of time for providing of the information and acceptance.

Korean Patent Registration No. 10-0888632 discloses an apparatus and a method of a mobile terminal for driving an application using an inertial sensor in which a signal corresponding to a change in a state of the mobile terminal according to movement of the mobile terminal is generated and is used as an input signal to drive a preset application in the mobile terminal.

The above information disclosed in this Background section is only for enhancement of understanding of the background of the invention and therefore it may contain information that does not form any part of the prior art nor what the prior art may suggest to a person of ordinary skill in the art.

Exemplary embodiments of the present invention provide a system and a method for setting a relationship between users effectively.

SUMMARY OF THE INVENTION

Exemplary embodiments of the present invention provide a social network service (SNS) providing system, a user terminal and a relationship setting method supporting a display of locations of users allowing location information to be shared with other users on a user terminal of the user when a friend request is sent to the other users and enables the user to select information on a desired user among information displayed on the other users and to register the desired user as a friend, thereby building a personal connection between the users, for example, a friendship, through a simple process of requesting and selecting.

Exemplary embodiments of the present invention also provide a system and a method for providing an SNS which enables users sending a friend request through user terminals within a preset distance to provide information on the users to each other and allowing one user to select information on a desired user among information displayed on the other users and to register the desired user as a friend, thereby building a personal connection between the users, for example, a friendship, through a simple process of request and selection.

Exemplary embodiments of the present invention also provide a system and a method for providing an SNS which enables users to utilize user terminals in a manner similar to exchanging business cards by simply bumping the user terminals together while touching a particular region, thereby building a personal connection between the users, for example, a friendship.

Additional features of the invention will be set forth in the description which follows, and in part will be apparent from the description, or may be learned by practice of the invention.

An exemplary embodiment of the present invention discloses a social network service (SNS) providing system which includes a reception unit to receive location information on a user terminal which allows the location information to be shared in response to a friend request from the user terminal, a user terminal identification unit to identify at least one other user terminal present within a preset distance based on the location information on the user terminal and allows location information to be shared, a user information transmission unit to identify and send user information on the at least one other user terminal to the user terminal, and a relationship setting unit to set a relationship between users of the user terminal and the at least one other user terminal when the user information on the at least one other user terminal is selected in the user terminal.

An exemplary embodiment of the present invention also discloses a user terminal operated by controlling an installed application, wherein the user terminal includes a transmission unit to send a friend request and location information to a server, a reception unit to receive user information on another user terminal from the server, and a display unit to display the user information, the other user terminal includes at least one other user terminal which allows providing location information among other user terminals present within a preset distance from location based on the location information, the transmission unit further sends user information selected by a user among the displayed user information to the server, and the server sets a relationship between the user and a user based on the sent user information.

An exemplary embodiment of the present invention also discloses an SNS providing system including a reception unit to receive location information on a user terminal in response to a friend request from the user terminal, a user terminal identification unit to identify at least one other user terminal present within a preset distance based on the location information on the user terminal and send a friend request, a user information transmission unit identify and send user information on the at least one other user terminal to the user terminal, and a relationship setting unit to set a relationship between users of the user terminal and the at least one other user terminal when the user information on the at least other user terminal is selected in the user terminal.

An exemplary embodiment of the present invention also discloses a user terminal operated by controlling an installed application, wherein the user terminal includes a transmission unit to send a friend request and location information to a server, a reception unit to receive user information on another user terminal from the server, and a display unit to display the user information, the other user terminal including at least one other user terminal which sends a friend request among other user terminals present within a preset distance from location based on the location information, the transmission unit further sends user information selected by a user among the displayed user information to the server, and the server sets a relationship between the user and a user based on the sent user information.

An exemplary embodiment of the present invention also discloses an SNS providing system which includes a reception unit to receive a friend request from each of a first user terminal and a second user terminal and a relationship setting unit to set a relationship between users of the first user terminal and the second user terminal, wherein the friend request is made by bumping the first user terminal and the second user terminal.

An exemplary embodiment of the present invention also discloses a user terminal operated by controlling an installed application, wherein the user terminal includes a motion sensing unit to sense a motion of bumping the user terminal and another user terminal and a transmission unit to send a friend request to a server based on a sensing result, the server sets a relationship between a user and the user of the other user terminal based on the friend request and a friend request from the other user terminal.

An exemplary embodiment of the present invention also discloses a relationship setting method including receiving location information on a user terminal which allows the location information to be shared in response to a friend request from the user terminal, identifying least one other user terminal present within a preset distance based on the location information on the user terminal and allows location information to be shared, identifying and sending user information on the other user terminal to the user terminal, and setting a relationship between users of the user terminal and the other user terminal when the user information on the other user terminal is selected in the user terminal.

An exemplary embodiment of the present invention also discloses a relationship setting method performed by a user terminal which operates according to control of an installed application, wherein the relationship setting method includes sending a friend request by the user terminal and location information to a server, receiving user information on another user terminal from the server, displaying the user information on a display, sending user information on at least one other user terminal selected by a user among the displayed user information to the server and setting a relationship between the user terminal and the at least one user terminal, wherein the at least one other user terminal allows location information to be shared among the other user terminals present within a predetermined distance from a location based on the location information, An exemplary embodiment of the present invention also discloses a relationship setting method which includes receiving location information on a user terminal by a friend request from the user terminal, identifying at least one other user terminal present within a preset distance based on the location information on the user terminal and sending a friend request, identifying and sending user information on the other user terminal to the user terminal, and setting a relationship between users of the user terminal and the other user terminal when the user information on the other user terminal is selected in the user terminal.

An exemplary embodiment of the present invention also discloses a relationship setting method performed by a user terminal operated by controlling an installed application, wherein the relation setting method includes sending a friend request and location information to a server, receiving user information on another user terminal from the server, and displaying the user information on a display, the other user terminal including at least one other user terminal which sends a friend request among other user terminals present within a preset distance from a location based on the location information, the sending further includes sending user information selected by a user among the displayed user information to the server, and the server sets a relationship between the user and a user based on the sent user information.

An exemplary embodiment of the present invention also discloses a relationship setting method which includes receiving a friend request from each of a first user terminal and a second user terminal and setting a relationship between users of the first user terminal and the second user terminal, wherein the friend request is made by bumping the first user terminal and the second user terminal.

An exemplary embodiment of the present invention also discloses a relationship setting method performed by a user terminal operated by controlling an installed application, wherein the relation setting method includes sensing a motion of bumping the user terminal and another user terminal and sending a friend request to a server based on a sensing result, and the server sets a relationship between a user and the user of the other user terminal based on the friend request and a friend request from the other user terminal.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
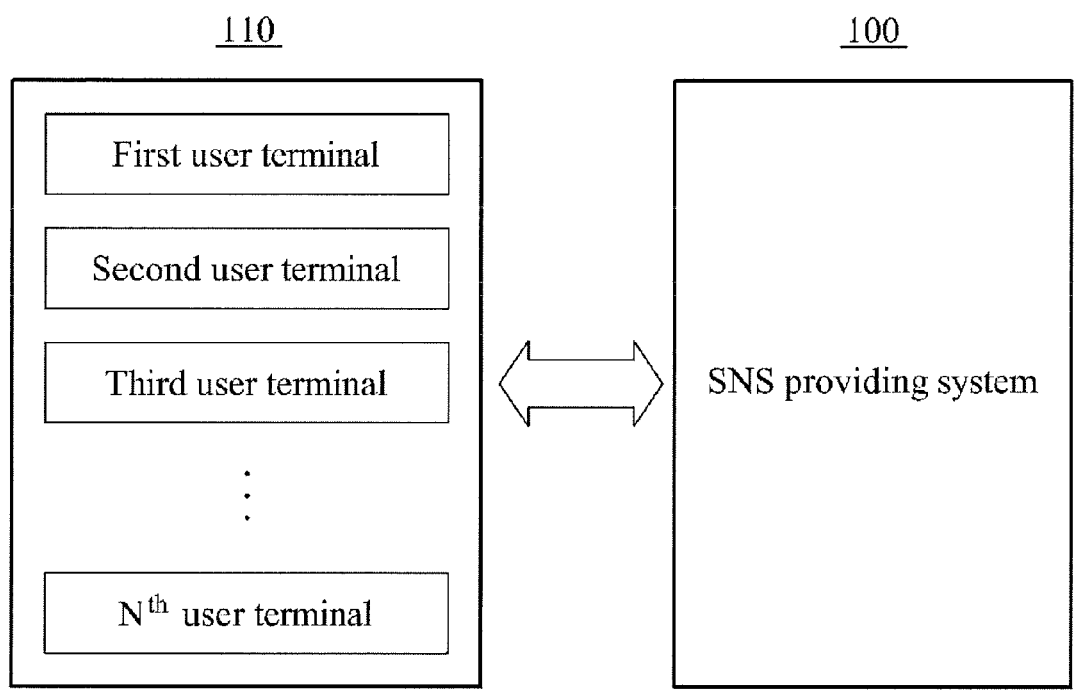
FIG. 1 schematically illustrates a social network service (SNS) providing system and a plurality of user terminals according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 schematically illustrates a social network service (SNS) providing system and a plurality of user terminals according to an exemplary embodiment of the present invention. FIG. 1 shows an SNS providing system 100 and a plurality of user terminals 110.

The SNS providing system 100 is capable of setting personal connections, such as a friendship, between users sharing similar interests, activities and backgrounds among the users of the plurality of user terminals 110. That is, in providing an SNS which enables users to build human networks on a web, the SNS providing system 100 may support building of personal connections between the users.

The plurality of user terminals 110 may include terminals of users subscribing to an SNS provided by the SNS providing system 100. For example, the user terminals 110 may include mobile terminals of users subscribing to a particular SNS, such as smart phones, and the users or the plurality of user terminals 110 may be identified by respective identifications of the users transmitted through the plurality of user terminals 110 or telephone numbers available for the plurality of user terminals 110. An application provided for the SNS may be installed in the plurality of user terminals 110, and each terminal may communicate with the SNS providing system 100 by controlling the application.

Here, the SNS providing system 100 may set personal connections among the users of the plurality of user terminals 110 in various ways.

In a first method, the SNS providing system 100 provides a user terminal making a friend request with user information on other user terminals present within a preset distance from the user terminal and allowing location information to be shared so that a user of the user terminal may select a user to build a relationship with, based on the user information shared with the user.

The SNS providing system 100 may receive location information on the user terminal in response to the friend request from the user terminal allowing the location information to be shared and identify at least one other user terminal present within the preset distance based on the location information on the user terminal and allowing location information to be shared. For example, the SNS providing system 100 may receive location information on a current location of the first user terminal according to a friend request from a first user terminal shown in FIG. 1 and identify other terminals which are present within the preset distance from the current location of the first user terminal, based on the location information and shared location information. When a second user terminal and an Nth user terminal are present within the preset distance from the current location of the first user terminal and the second user terminal and a third user terminal allowing location information to be shared, the SNS providing system 100 may identify the second user terminal which is present within the preset distance from the current location of the first user terminal as well as allowing location information to be shared.

Further, the SNS providing system 100 may identify user information on another identified user terminals and send the user information to the user terminal. When the user terminal selects the user information on the other user terminal, the SNS providing system 100 may set a relationship between users of the user terminal and the other user terminals.

Throughout this disclosure, the term "relationship" between users may refer to a personal connection, such as a friend, as described above, and a relationship between users may include a unilateral relationship. For example, when a user A adds a user B as a friend but the user B opts against adding the user A as a friend, a relationship between the users is considered to be set.

Figure 2:
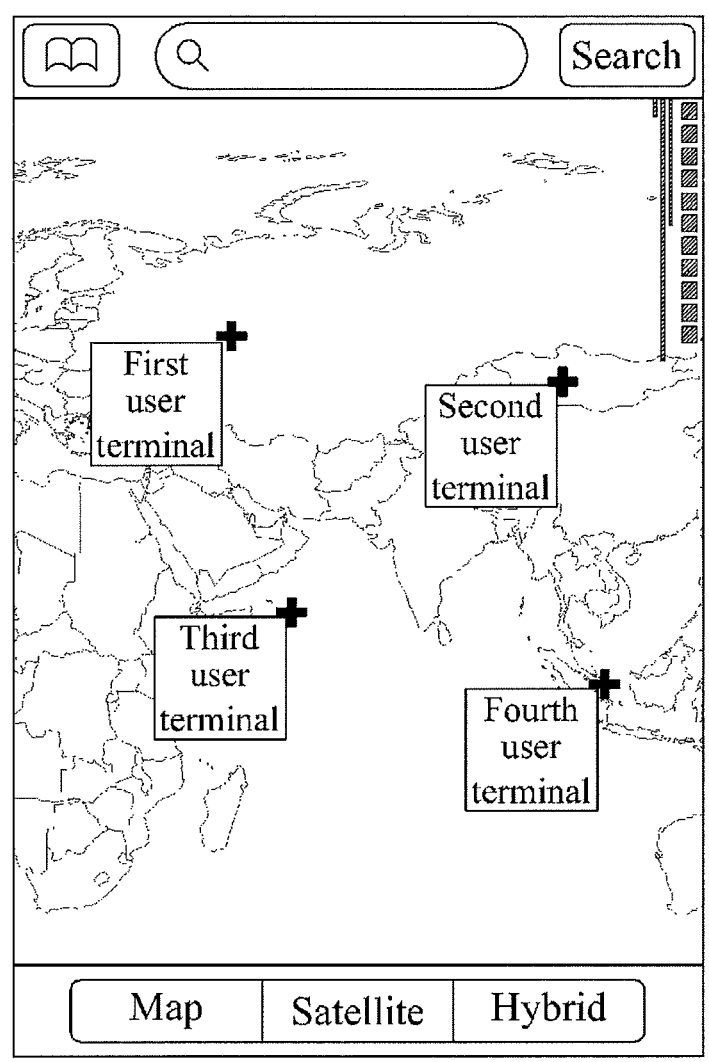
FIG. 2 illustrates a display presenting user information on a map according to an exemplary embodiment of the present invention.

FIG. 2 illustrates a display presenting user information on a map according to an exemplary embodiment of the present invention. FIG. 2 illustrates a display 200 of a user terminal belonging to one user. Here, plus sign symbols on the display 200 may indicate locations of other users on the map, particularly locations of user terminals of the other users, and user information on the users in the corresponding locations are illustrated in square boxes. That is, the square boxes marked with users 1 to 4 may display the user information on the respective users. Here, the user information may include at least one of a user name or telephone number, a user nickname, a user image, user status information and user location based on location information on a user terminal. Further, as necessary, location of the user terminal of the one user may be also displayed on the display 200.

Referring to FIGS. 1 and 2, the SNS providing system 100 may receive location information from the user terminal including the display 200 of FIG. 2, identify at least one other user terminal present within a preset distance based on the received location information and allows location information to be shared, and provides user information on the other user terminals identified to the user terminal. In this case, information on users may be displayed on the display 200 of the user terminal as shown in FIG. 2. Here, when the user of the user terminal selects at least one piece of user information from among the information on users displayed on the display 200, the selected user information may be sent to the SNS providing system 100. The SNS providing system 100 may receive the user information and set a relationship between a user corresponding to the received user information and the user of the user terminal based on the received user information. For example, the SNS providing system 100 may store user information on the user terminal and user information on other user terminals in association with each other, thereby setting the relationship between the users.

Figure 3:
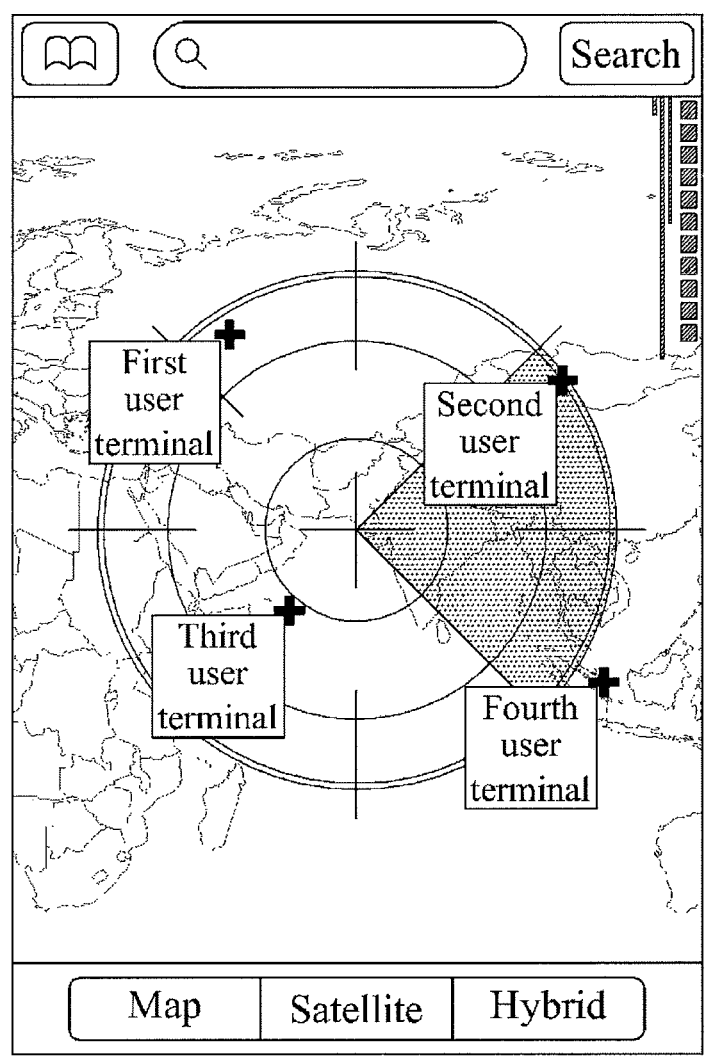
FIG. 3 illustrates a display presenting user information and an indication line on a map according to an exemplary embodiment of the present invention.

FIG. 3 illustrates a display presenting user information and an indication line on a map according to an exemplary embodiment of the present invention. FIG. 3 illustrates a display 300 of a user terminal belonging to one user. Here, the display 300 presents not only user information but also an indication line on the map. FIG. 3 illustrates a case in which an indication line rotates in a clockwise direction using a display method of a radar system and user information is displayed in order of user terminals in relatively close proximity to the user terminal according to a trace of the indication line.

Referring to FIG. 1, in a second method, the SNS providing system 100 may set a relationship between users of user terminals making a mutual friend request within a preset distance.

First, the SNS providing system 100 may receive location information on a user terminal according to a friend request from the user terminal and identify at least one other user terminal present within the preset distance based on the location information on the user terminal and sends a friend request. For example, when a friend request is made from a second user terminal present within the preset distance from a first user terminal, the SNS providing system 100 may identify the second user terminal as the other user terminal.

Further, the SNS providing system 100 may identify and send user information on the other user terminal to the user terminal, and set a relationship between users of the user terminal and the other user terminal when the user terminal selects the user information on the other user terminal. For example, when the second user terminal is identified according to a friend request of the first user terminal, user information on the second user terminal may be sent to the first user terminal. Here, when a user of the first user terminal selects the user information on the other user terminal in the first user terminal, the SNS providing system 100 may set a relationship between the users of the first user terminal and the second user terminal. For example, the SNS providing system 100 may store user information on the first user terminal and the user information on the second user terminal in association with each other.

Figure 4:
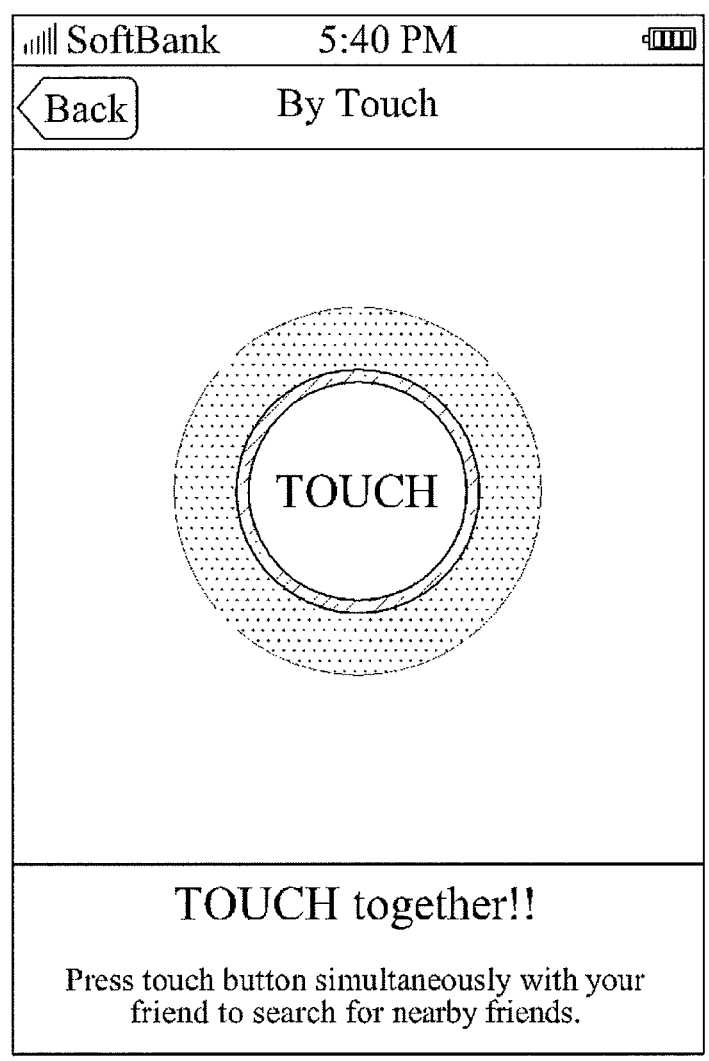
FIG. 4 illustrates a display presenting an add friend button according to an exemplary embodiment of the present invention.
Figure 5:
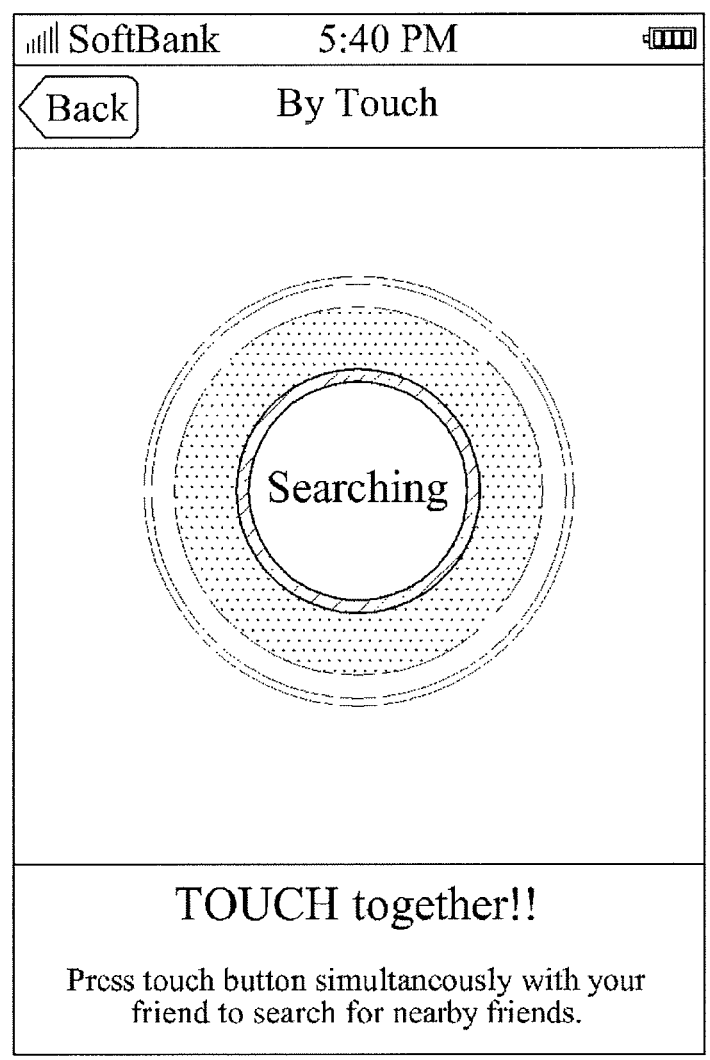
FIG. 5 illustrates a display showing that a friend to be added is being searched for according to an exemplary embodiment of the present invention.
Figure 6:
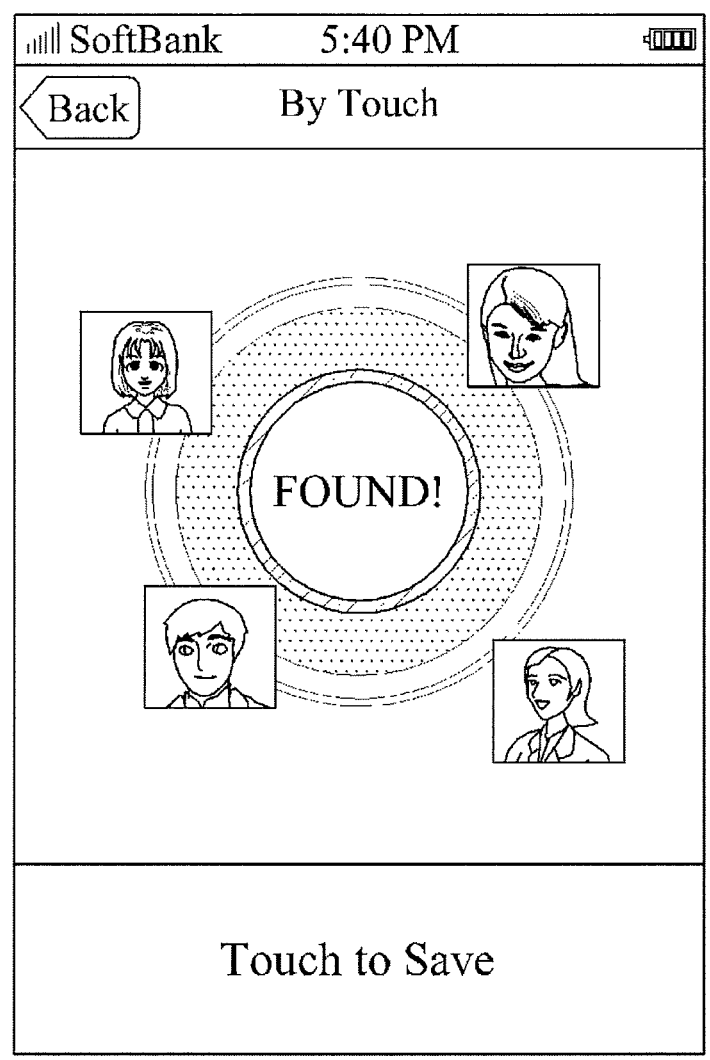
FIG. 6 illustrates a display presenting information on a found friend according to an exemplary embodiment of the present invention.

FIG. 4 illustrates a display presenting an add friend button according to an exemplary embodiment of the present invention, and FIG. 5 illustrates a display showing that a friend to be added is being searched for according to an exemplary embodiment of the present invention. FIG. 6 illustrates a display presenting information on a found friend according to an exemplary embodiment of the present invention.

That is, an input interface, such as an add friend button, is set up in a preset region of a display 400 of FIG. 4, and a friend request may be made when a user touches the add friend button.

A display 500 of FIG. 5 shows that friends to be added are being searched for as a friend request is made by touching the add friend button as shown in FIG. 4. Here, the friend request may be sent to the SNS providing system 100 described with reference to FIG. 1, and the SNS providing system 100 may provide information on friends to be added to a user terminal based on location information on the user terminal received through the user terminal according to the friend request. That is, the SNS providing system 100 may conduct a process of setting a relationship between users touching the add friend button within a preset distance.

A display 600 of FIG. 6 displays user information on other user terminals which are present within the preset distance from the user terminal and touch the add friend button. Here, the user information on other user terminals may be displayed on the display 600 based on distances of the user terminals from center of a region where the add friend button is provided. Although the display 600 of FIG. 6 displays an image set by a user as user information, the user information may include, as described above, at least one of a user name or telephone number, a user nickname, a user image, user status information and location of a user based on location information on a user terminal.

The distance illustrated in FIGS. 5 and 6 may be set by the SNS providing system 100 described with reference to FIG. 1, set by an application installed in the user terminal, or set directly by a user.

Figure 7:
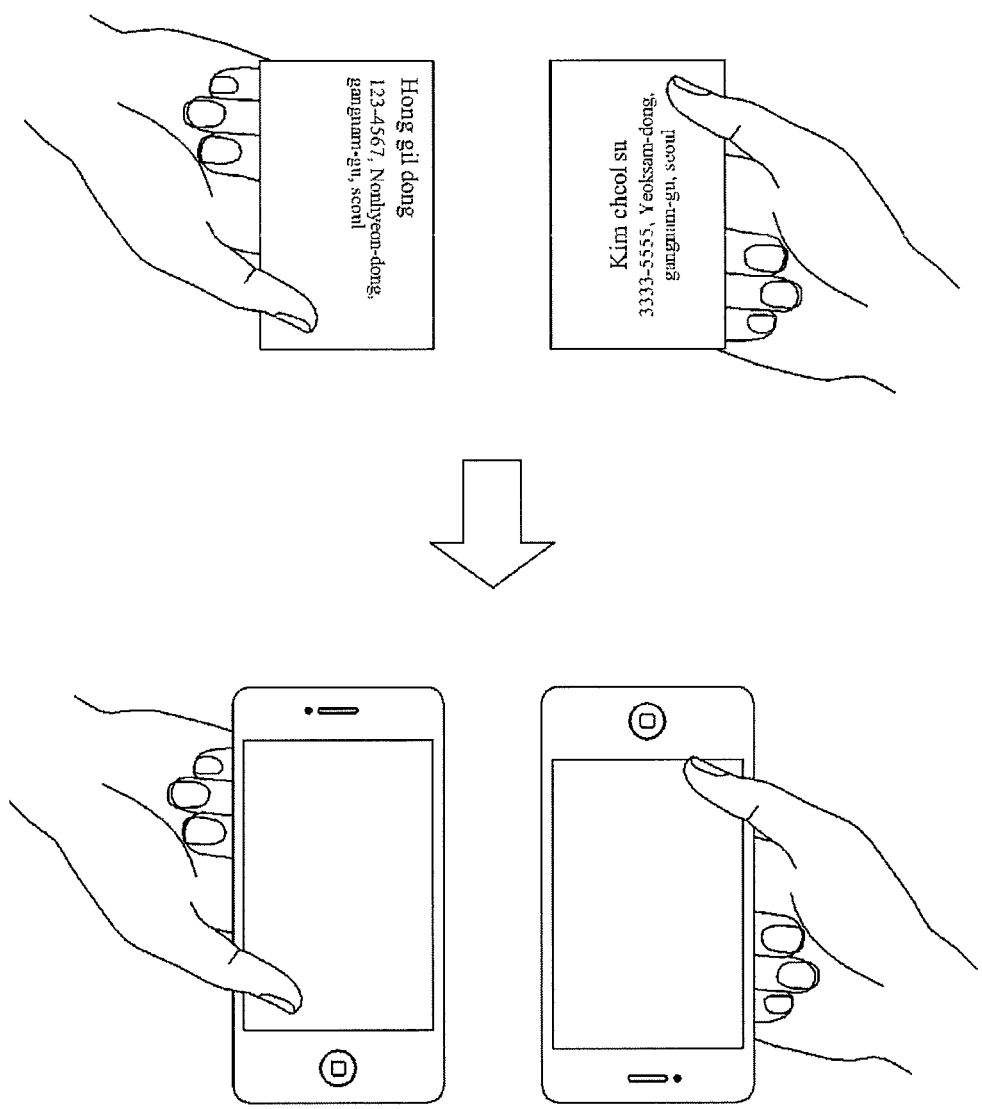
FIG. 7 illustrates a method of setting a relationship between user terminals by bumping the user terminals according to an exemplary embodiment.

Referring to FIG. 1, in a third method, the SNS providing system 100 may set a relationship between users of at least two user terminals through a friend request made by bumping the two user terminals, as described herein with reference to FIG. 7.

FIG. 7 illustrates a method of setting a relationship between user terminals by bumping the user terminals according to an exemplary embodiment. That is, FIG. 7 shows that a relationship between users is set by the users holding and bumping user terminals in a manner similar to exchanging business cards. Here, a friend request may be made when the bumping motion is perceived with a particular region on displays of the user terminals being touched, and the request may be sent to the SNS providing system 100 shown in FIG. 1. In this case, the SNS providing system 100 may set a relationship between the users of the user terminals sending the friend request.

Figure 8:
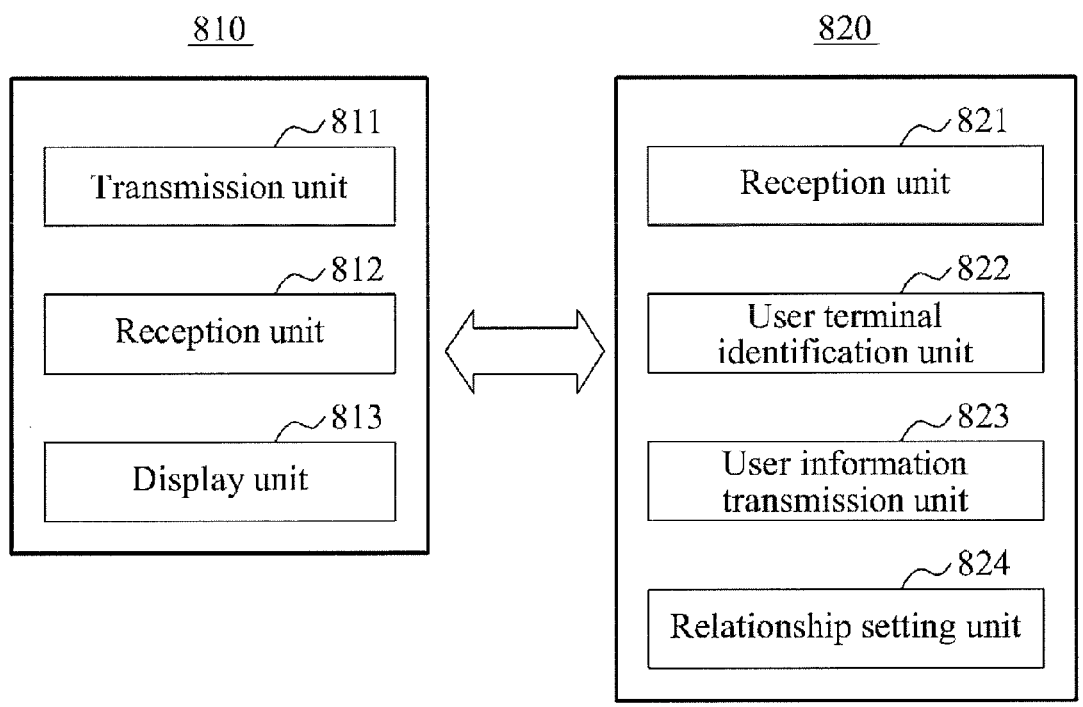
FIG. 8 is a block diagram illustrating a configuration of a user terminal and a configuration of an SNS providing system according to an exemplary embodiment of the present invention.

FIG. 8 is a block diagram illustrating a configuration of a user terminal and a configuration of an SNS providing system according to an exemplary embodiment of the present invention. The user terminal 810, according to the present embodiment, may include a transmission unit 811, a reception unit 812 and a display unit 813, and the SNS providing system 820 may include a reception unit 821, a user terminal identification unit 822, a user information transmission unit 823 and a relationship setting unit 824.

The transmission unit 811 of the user terminal 810 sends a friend request and location information to a server, that is, the SNS providing system 820. Here, the user terminal 810 may be operated by controlling an application installed in the user terminal 810, and whether to allow the location information to be shared may be determined based on a setting of the application installed in the user terminal 810. For example, the friend request may also be sent from the user terminal 810 to the SNS providing system 820 according to control of the application installed in the user terminal 810.

Here, the reception unit 821 of the SNS providing system 820 receives the location information on the user terminal 810 based on the friend request from the user terminal 810 allowing the location information to be shared. That is, the reception unit 821 of the SNS providing system 820 may receive the location information sent by the transmission unit 811 of the user terminal 810.

The user terminal identification unit 822 of the SNS providing system 820 identifies at least one other user terminal present within a preset distance based on the location information on the user terminal 810 and allows location information to be shared. Here, it may be also determined whether the other user terminal allows location information to be shared, based on a setting of an application installed in the other user terminal. For example, when the preset distance is 50 meters, the user terminal identification unit 822 may identify another user terminal present within a 50-meter distance from current location of the user terminal 810 and allowing location information to be shared.

Here, a map may be displayed on a display of the user terminal 810 through the application installed in the user terminal 810 and the distance may be preset based on a scale of the map. For example, the greater the scale of the map is, the shorter the distance, and the smaller the scale of the map is, the longer the distance. That is, when a user adjusts the scale of the map through the application installed in the user terminal 810, the distance may be set based on the adjusted scale.

Accordingly, the transmission unit 811 of the user terminal 810 may further send information on the scale of the map to the server, the SNS providing system 820, and the reception unit 821 of the SNS providing system 820 may further receive the information on the scale of the map from the user terminal 810. In this case, the user terminal identification unit 822 of the SNS providing system 820 may set the distance using the received information on the scale.

The user information transmission unit 823 of the SNS providing system 820 identifies and sends user information on the other user terminal to the user terminal 810. Here, user information on other user terminals may be sequentially displayed on the display of the user terminal 810 according to the distance through the application installed in the user terminal 810.

That is, the reception unit 812 of the user terminal 810 may receive the user information on the other user terminal from the server, the SNS providing system 820, and the display unit 813 of the user terminal 810 may display the user information on the display. Here, the display unit 813 may sequentially display the user information on the other user terminals according to the distance. For example, a particular region of the display is set as the current location of the user terminal 810, and the longer the distance is, the farther a location, in which the user information is displayed, is from the particular region.

For example, the display of the user terminal 810 may further display a map, and the user information on the other user terminals may be sequentially displayed on the map based on distances between location of the user terminal 810 and locations of the other user terminals.

Alternatively, the display of the user terminal 810 may further display a map and an indication line that is in motion on the map, and the user information on the other user terminal may be displayed on the map based on a distance between the location of the user terminal and the location of the other user terminal and location of the indication line on the map. Here, the user information may be displayed on the map when the indication line passes by the location on the map according to the distance. That is, as shown in FIG. 2, assuming that the indication line rotates in a clockwise direction as a display of a radar system, user information may be sequentially displayed according to movement of the indication line.

Here, the transmission unit 811 of the user terminal 810 may further send user information selected by the user among the displayed user information to the SNS providing system 820.

The relationship setting unit 824 of the SNS providing system 820 may set a relationship between the users of the user terminal 810 and the other user terminal when the user information on the other user terminal is selected in the user terminal 810. For example, the SNS providing system 820 may receive user information additionally sent by the transmission unit 811 of the user terminal 810 and store the received user information and the user information on the user terminal 810 associated with the users, thereby setting the relationship between the users.

That is, when one user makes a friend request to other users allowing location information to be shared, locations of the other users around the user are displayed on the user terminal 810, and the user selects information on a desired user among the displayed information on the other users and registers the desired user as a friend, thereby building a personal connection between the users like a friend through a simple process of request and selection.

Figure 9:
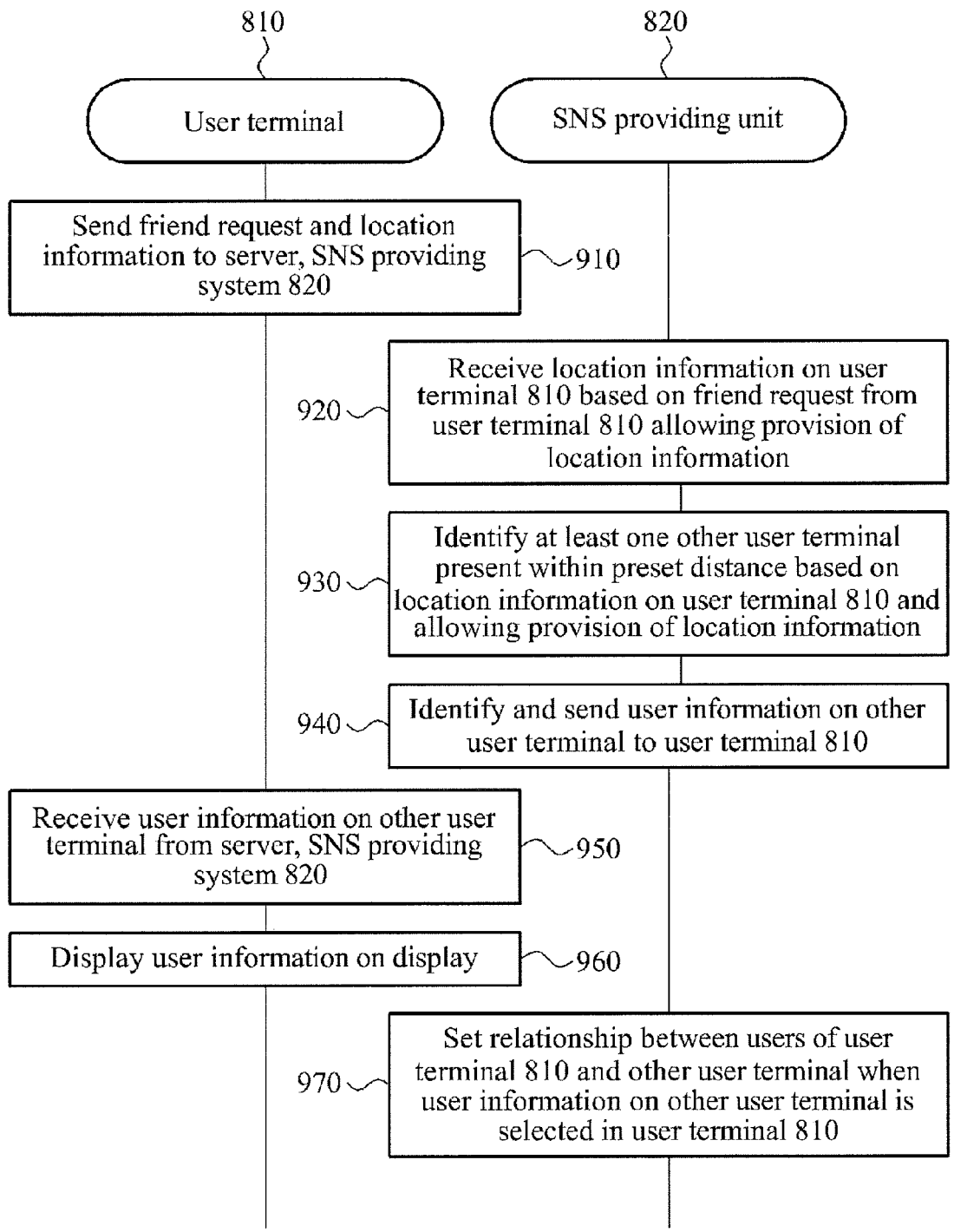
FIG. 9 is a flowchart illustrating a relationship setting method according to an exemplary embodiment of the present invention.

FIG. 9 is a flowchart illustrating a relationship setting method according to an exemplary embodiment of the present invention. The relationship setting method according to the present embodiment may be carried out by the user terminal 810 and the SNS providing system 820 described with reference to FIG. 8. Further, the relationship setting method may include processes conducted by the user terminal 810 or processes conducted by the SNS providing system 820.

In operation 910, the user terminal 810 sends a friend request and location information to a server, the SNS providing system 820. Here, the user terminal 810 may be operated by controlling an application installed in the user terminal 810, and whether to allow the location information to be shared may be determined based on a setting of the application installed in the user terminal 810. For example, a friend request may be also sent from the user terminal 810 to the SNS providing system 820 according to control of the application installed in the user terminal 810.

In operation 920, the SNS providing system 820 receives the location information on the user terminal 810 by a friend request from the user terminal 810 allowing the location information to be shared. That is, in operation 920, the SNS providing system 820 may receive the location information sent by the user terminal 810.

In operation 930, the SNS providing system 820 identifies at least one other user terminal present within a preset distance, based on the location information on the user terminal 810 and allows the location information to be shared. Here, it may be also determined whether the other user terminal allows location information to be shared based on a setting of an application installed in the other user terminal. That is, when the preset distance is 50 meters, the SNS providing system 820 may identify another user terminal present within a 50-meter distance from current location of the user terminal 810 and allows location information to be shared.

Here, a map may be displayed on the display of the user terminal 810 through the application installed in the user terminal 810 and the distance may be preset based on a scale of the map. For example, the greater the scale of the map is, the shorter the distance, and the smaller the scale of the map is, the longer the distance. That is, when a user adjusts the scale of the map through the application installed in the user terminal 810, the distance may be set based on the adjusted scale.

Accordingly, the user terminal 810 may further send information on the scale of the map to the server, the SNS providing system 820, and the SNS providing system 820 may further receive the information on the scale of the map from the user terminal 810. In this case, the SNS providing system 820 may set the distance using the received information on the scale.

In operation 940, the SNS providing system 820 identifies and sends user information on the other user terminal to the user terminal 810. Here, user information on other user terminals may be sequentially displayed on the display of the user terminal 810 according to the distance determined through the application installed in the user terminal 810.

In operation 950, the user terminal 810 may receive the user information on the other user terminal from the SNS providing system 820, that is, the server.

In operation 960, the user terminal 810 may display the user information on the display. Here, the user terminal 810 may sequentially display the user informations on the other user terminals according to the distance. For example, when a particular region of the display is set as the current location of the user terminal 810, and the longer the distance is, the farther a location, in which the user information is displayed, is from the particular region.

For example, the display of the user terminal 810 may further display a map, and the user information on the other user terminals may be sequentially displayed on the map based on distances between location of the user terminal 810 and locations of the other user terminals.

Alternatively, the display of the user terminal 810 may further display a map and an indication line that is in motion the map, and the user information on the other user terminal may be displayed on the map based on a distance between the location of the user terminal and the location of the other user terminal, and location of the indication line on the map. Here, the user information may be displayed on the map when the indication line passes by the location on the map according to the distance. That is, as shown in FIG. 2, assuming that the indication line rotates in a clockwise direction as a display of a radar system, user information may be sequentially displayed according to the movement of the indication line.

Here, the user terminal 810 may further send user information selected by the user among the displayed user information to the SNS providing system 820.

In operation 970, the SNS providing system 820 may set a relationship between the users of the user terminal 810 and the other user terminal when the user information on the other user terminal is selected in the user terminal 810. For example, the SNS providing system 820 may receive user information additionally sent by the user terminal 810 and store the receive user information with the user information on the user terminal 810 in association with each other, thereby setting the relationship between the users.

That is, when one user makes a friend request to other users allowing location information to be shared, locations of the other users around the user are displayed on the user terminal 810, and the user is allowed to select information on a desired user among the displayed information on the other users and to register the desired user as a friend, thereby building a personal connection between the users, for example, a friendship, through a simple process of request and selection.

Figure 10:
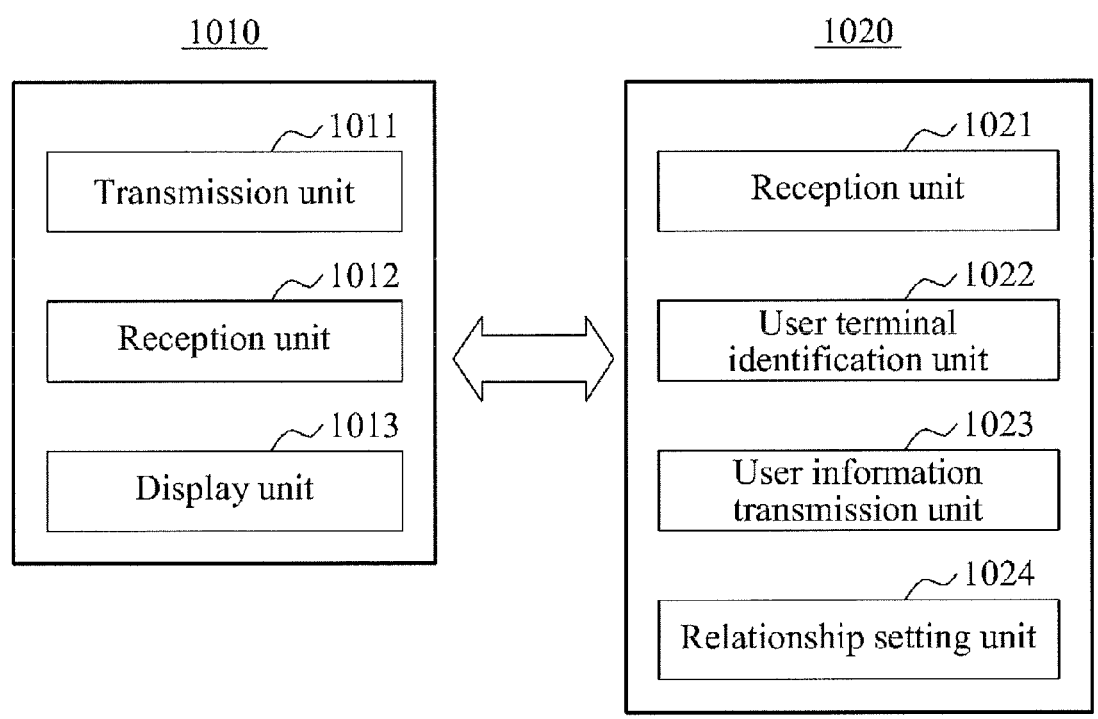
FIG. 10 is a block diagram illustrating a configuration of a user terminal and a configuration of an SNS providing system according to another exemplary embodiment of the present invention.

FIG. 10 is a block diagram illustrating a configuration of a user terminal and a configuration of an SNS providing system according to another exemplary embodiment of the present invention. The user terminal 1010 according to the present embodiment may include a transmission unit 1011, a reception unit 1012 and a display unit 1013, and the SNS providing system 1020 may include a reception unit 1021, a user terminal identification unit 1022, a user information transmission unit 1023 and a relationship setting unit 1024.

The transmission unit 1011 of the user terminal 1010 sends a friend request and location information to a server, that is, the SNS providing system 1020. Here, the user terminal 1010 may be operated by controlling an application installed in the user terminal 1010, and whether to allow the location information to be shared may be determined based on a setting of the application installed in the user terminal 1010. Here, the friend request may be made when a preset region on a display of the user terminal 1010 is touched. Here, the preset region may be displayed on the display through control of the application installed in the user terminal 1010. For example, an input interface, such as an add friend button, may be set in the preset region, and the friend request may be sent to the SNS providing system 1020 when a user touches the region.

Here, the reception unit 1021 of the SNS providing system 1020 receives the location information on the user terminal 1010 based on the friend request from the user terminal 1010. That is, the reception unit 1021 of the SNS providing system 1020 may receive the location information sent by the transmission unit 1011 of the user terminal 1010.

The user terminal identification unit 1022 of the SNS providing system 1020 identifies at least one other user terminal present within a preset distance based on the location information on the user terminal 1010 and sends a friend request. Here, the other user terminal may also send a friend request to the SNS providing system 1020 when a preset region displayed on a display through control of an application installed in the other user terminal is touched. That is, the user terminal identification unit 1022 may identify the other user terminal making a mutual friend request with the user terminal 1010 within a preset distance. For example, the other user terminal making a mutual friend request with the user terminal 1010 within a 5-meter distance may be identified by the user terminal identification unit 1022.

Here, the distance may include at least one of a preset default distance and a distance set by the user through an application installed in the user terminal 1010. When the user personally sets the distance, the reception unit 1021 of the SNS providing system 1020 may further receive information on a distance set by the user through the application installed in the user terminal 1010 from the user terminal 1010. The distance mentioned in FIGS. 8 and 9 may also include a preset default distance or a distance set by the user.

The user information transmission unit 1023 of the SNS providing system 1020 identifies and sends user information on the other user terminal to the user terminal 1010.

Here, the reception unit 1012 of the user terminal 1010 may receive the user information on the other user terminal from the server, the SNS providing system 1020, and the display unit 1013 of the user terminal 1010 may display the user information on the display. Here, the display unit 1013 may display the user information on the other user terminal on the display of the user terminal 1010 based on a distance to the location of the other user terminal from the location of the user terminal 1010. Here, a center of the preset region may correspond to the location of the user terminal 1010. That is, user information may be displayed on the display based on the distance from the center of the preset region. For example, the longer the distance, the farther a location, in which the user information is displayed, is from the particular region.

Here, the transmission unit 1011 of the user terminal 1010 may further send user information selected by the user among the displayed user information to the SNS providing system 1020.

The relationship setting unit 1024 of the SNS providing system 1020 may set a relationship between users of the user terminal 1010 and the other user terminal when the user information on the other user terminal is selected in the user terminal 1010. For example, the SNS providing system 1020 may receive user information additionally sent by the transmission unit 1011 of the user terminal 1010 and store the received user information and the user information on the user terminal 1010 in association with each other, thereby setting the relationship between the users.

Here, when a plurality of user information is displayed on the display of the user terminal 1010 and the preset region of the display is touch again after displaying the plurality of user information, the relationship setting unit 1024 of the SNS providing system 1020 may set relationships between the user of the user terminal and users based on an entirety of the user information displayed. That is, the user may select each individual piece of user information at a time or select all displayed user information at once.

By way of example, users making a friend request through respective user terminals 1010 within a preset distance provide information to one another, and one user selects information on a desired user among the provided information on the other users and registers the user as a friend, thereby building a personal connection between the users like a friend through a simple process of request and selection.

Figure 11:
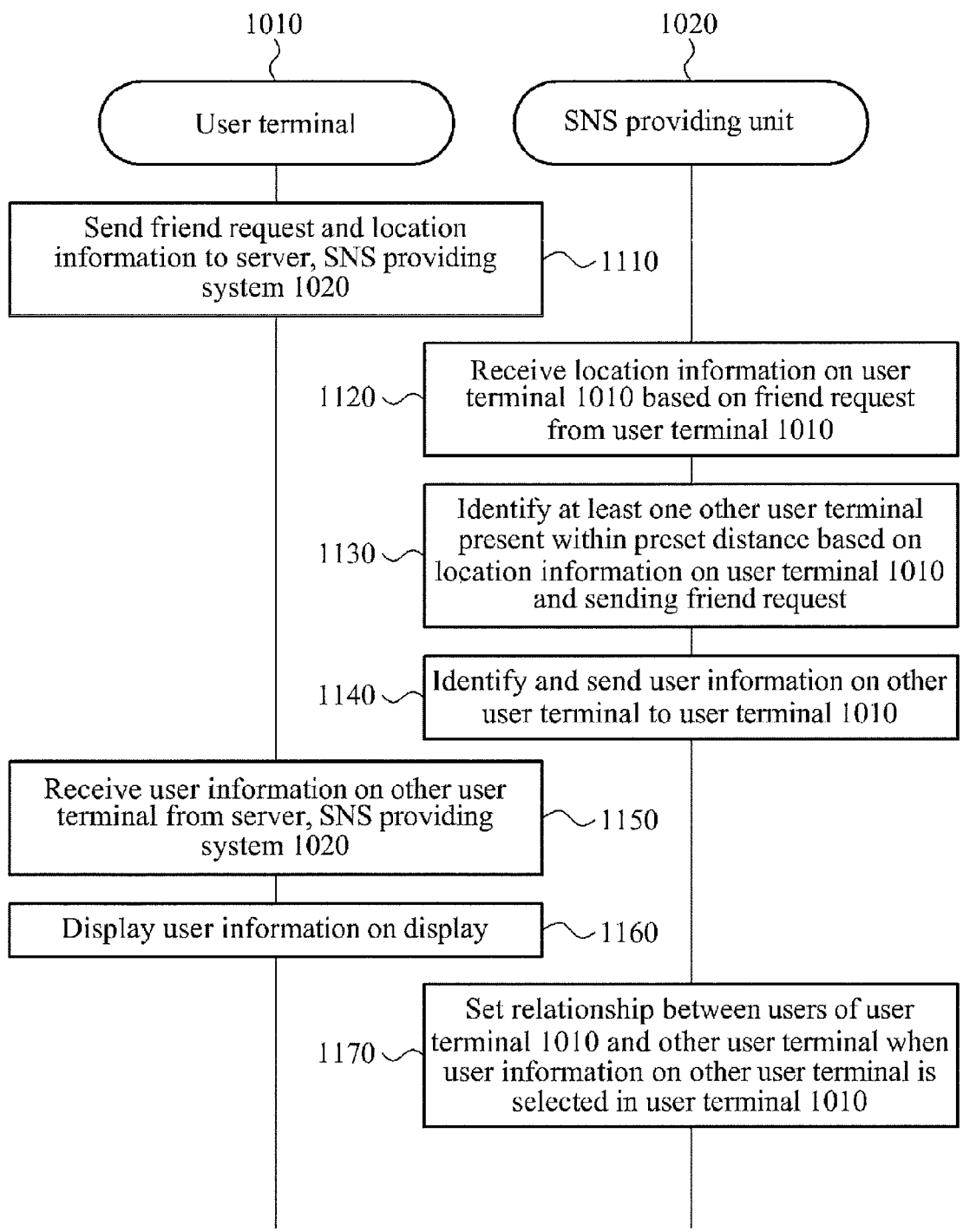
FIG. 11 is a flowchart illustrating a relationship setting method according to another exemplary embodiment of the present invention.

FIG. 11 is a flowchart illustrating a relationship setting method according to another exemplary embodiment of the present invention. The relationship setting method according to the present embodiment may be carried out by the user terminal 1010 and the SNS providing system 1020 described with reference to FIG. 10. Further, the relationship setting method may include processes conducted by the user terminal 1010 or processes conducted by the SNS providing system 1020.

In operation 1110, the user terminal 1010 sends a friend request and location information to a server, that is, the SNS providing system 1020. Here, the user terminal 1010 may be operated by controlling an application installed in the user terminal 1010, and whether to allow the location information to be shared may be determined based on a setting of the application installed in the user terminal 1010. Here, the friend request may be made when a preset region on a display of the user terminal 1010 is touched. Here, the preset region may be displayed on the display through control of the application installed in the user terminal 1010. For example, an input interface, such as an add friend button, may be set in the preset region, and the friend request may be sent to the SNS providing system 1020 when a user touches the region.

In operation 1120, the SNS providing system 1020 receives the location information on the user terminal 1010 based on the friend request from the user terminal 1010. That is, in operation 1120, the SNS providing system 1020 may receive the location information sent by the user terminal 1010 in operation 1110.

In operation 1130, the SNS providing system 1020 identifies at least one other user terminal which is present within a preset distance based on the location information on the user terminal 1010 and sends a friend request.

Here, the other user terminal may also send a friend request to the SNS providing system 1020 when a preset region displayed on a display through control of an application installed in the other user terminal is touched. That is, the other user terminal which makes a mutual friend request with the user terminal 1010 within a preset distance may be identified in operation 1130. For example, the other user terminal making a mutual friend request with the user terminal 1010 within a 5-meter distance may be identified by the SNS providing system 1020.

Here, the distance may include at least one of a preset default distance and a distance set by the user through an application installed in the user terminal 1010. When the user personally sets the distance, the SNS providing system 1020 may additionally receive information on a distance set by the user through the application installed in the user terminal 1010 from the user terminal 1010.

In operation 1140, the SNS providing system 1020 identifies and sends user information on the other user terminal to the user terminal 1010.

In operation 1150, the user terminal 1010 may receive the user information on the other user terminal from the server, that is, the SNS providing system 1020.

In operation 1160, the user terminal 1010 may display the user information on the display. Here, the user terminal 1010 may display the user information on the other user terminal on the display of the user terminal 1010 based on a distance to the location of the other user terminal from the location of the user terminal 1010. Here, a center of the preset region may correspond to the location of the user terminal 1010. In other words, user information may be displayed on the display based on the distance from the center of the preset region. For example, the longer the distance is, the farther the region in which the user information is displayed, is from the center.

Here, the user terminal 1010 may additionally send user information selected by the user among the displayed user information to the SNS providing system 1020.

In operation 1170, the SNS providing system 1020 may set a relationship between users of the user terminal 1010 and the other user terminal when the user information on the other user terminal is selected in the user terminal 1010. For example, the SNS providing system 1020 may receive user information additionally sent by the user terminal 1010 and store the received user information and the user information on the user terminal 1010 in association with each other, thereby setting the relationship between the users.

In this instance, when a plurality of user information is displayed on the display of the user terminal 1010 and the preset region of the display is touched again after displaying the plurality of user information, the SNS providing system 1020 may set relationships between the user of the user terminal and users based on an entirety of displayed user information. That is, the user may select each individual piece of user information at a time or select the displayed user information, as a whole, at once.

That is, users making a friend request through respective user terminals 1010 within a preset distance provide information to one another, and one user selects information on a desired user among the provided information on the other users and registers the user as a friend, thereby building a personal connection between the users, for example, a friendship, through a simple process of request and selection.

Figure 12:
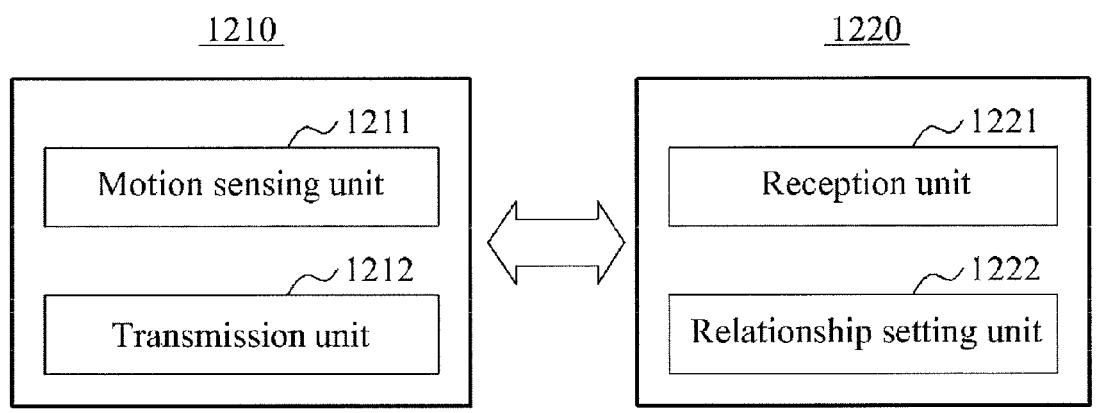
FIG. 12 is a block diagram illustrating a configuration of a user terminal and a configuration of an SNS providing system according to still another exemplary embodiment of the present invention.

FIG. 12 is a block diagram illustrating a configuration of a user terminal and a configuration of an SNS providing system according to still another exemplary embodiment of the present invention. The user terminal 1210 according to the present embodiment may include a motion sensing unit 1211 and a transmission unit 1212, and the SNS providing system 1220 may include a reception unit 1221 and a relationship setting unit 1224.

The motion sensing unit 1211 of the user terminal 1210 senses a motion of bumping the user terminal 1210 and another user terminal. For example, the motion of bumping may include a motion of bringing the user terminal 1210 and another user terminal into contact.

The transmission unit 1212 of the user terminal 1210 sends a friend request to a server, that is, the SNS providing system 1220 based on a sensing result. Here, the friend request may be made when a motion of bumping the user terminal 1210 and the other user terminal is sensed while a region set on a display according to control of an application installed in the user terminal 1210 is touched.

Here, the region may be activated using at least one of three methods detailed in the following.

In a first method, the region may be activated by the application when an add friend mode is set in the application based on an input of a user.

In a second method, the region may be activated after an add friend region displayed on the display is touched. In this case, the add friend region may be displayed on the display according the application being controlled.

In a third method, the region may be activated when the application is executed.

That is, when the user bumps the user terminal 1210 on the other user terminal while touching the activated region, the user terminal 1210 may sense the bumping motion and send the friend request to the SNS providing system 1220. The other user terminal may also activate a region on a display of the other user terminal according to control of an application installed in the other user, and when a user of the other user terminal bumps the other user terminal on the user terminal 1210 while touching the activated region, the other user terminal may sense the bumping motion and send a friend request to the SNS providing system 1220.

Here, the server, the SNS providing system 1220, may set a relationship between the users of the user terminal 1210 and the other user terminal based on the friend request and the friend request from the other user terminal. Further, when the relationship is set, the user terminal 1210 may send user information on the user to the SNS providing system 1220 or receive user information on the other user terminal from the SNS providing system 1220. In this case, the user information on the user sent to the SNS providing system 1220 may be sent to the other user terminal through the SNS providing system 1220. In other words, when the relationship between the users is established, the user information, such as a user profile, may be exchanged between the user terminals.

The reception unit 1221 of the SNS providing system 1220 receives a friend request from each of the user terminal 1210, that is, a first user terminal and the other user terminal, that is, a second user terminal. Here, as described above, the friend request may be made through a bumping motion of the first user terminal and the second user terminal. In detail, the friend request may be made by bumping the first user terminal and the second user terminal while a first preset region on the display of the first user terminal and a second preset region on the display of the second user are touched.

Here, the first region and the second region may be activated by at least one of the foregoing three methods.

That is, in the first method, the first region may be activated by a first application when an add friend mode is set in the first application installed in the first user terminal, and the second region may be activated by a second application when an add friend mode is set in the second application installed in the second user terminal.

In the second method, the first region and the second region may be activated when add friend regions respectively displayed on the displays of the first user terminal and the second user terminal are touched. Here, the add friend regions may be displayed on the displays through control of applications respectively installed in the first user terminal and the second user terminal.

In the third method, the first region and the second region may be activated when applications respectively installed in the first user terminal and the second user terminal are executed.

The relationship setting unit 1222 of the SNS providing system 1220 sets a relationship between the users of the first user terminal and the second user terminal. For example, the relationship setting unit 1222 may store the user information on the first user terminal and the user information on the second user terminal in association with each other, thereby setting the relationship.

Further, the SNS providing system 1220 may further include a user information provision unit (not shown) to provide the user information on the second user terminal to the first user terminal or provide the user information on the first user terminal to the second user terminal when the relationship is set. That is, when the relationship is established between the users, the user information, such as a user profile, may be exchanged between the user terminals.

Thus, the users hold the user terminals in a manner similar to holding business cards to be exchanged and simply bump the user terminals while a particular region is touched, thereby building a personal connection, for example, a friendship, between the users.

Figure 13:
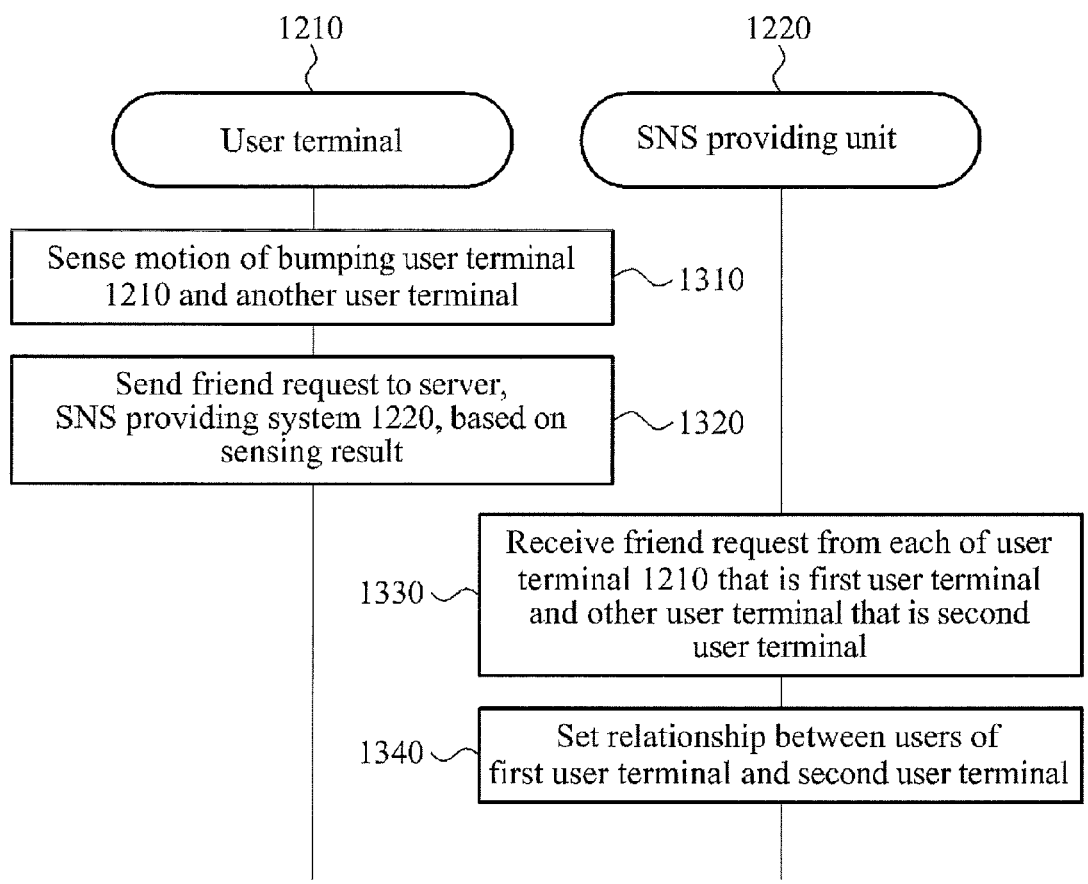
FIG. 13 is a flowchart illustrating a relationship setting method according to still another exemplary embodiment of the present invention.

FIG. 13 is a flowchart illustrating a relationship setting method according to still another exemplary embodiment of the present invention. The relationship setting method according to the present embodiment may be carried out by the user terminal 1210 and the SNS providing system 1220 described with reference to FIG. 12. Further, the relationship setting method may include processes conducted by the user terminal 1210 or processes conducted by the SNS providing system 1220.

In operation 1310, the user terminal 1210 senses a motion of bumping the user terminal 1210 and another user terminal.

In operation 1320, the user terminal 1210 sends a friend request to a server, that is, the SNS providing system 1220 based on a sensing result. Here, the friend request may be made when a motion of bumping the user terminal and the other user terminal is sensed while a region set on a display according to control of an application installed in the user terminal 1210 is touched.

Here, the region may be activated using at least one of three methods as detailed in the following.

In a first method, the region may be activated by the application when an add friend mode is set in the application based on an input of a user.

In a second method, the region may be activated after an add friend region displayed on the display is touched. In this case, the add friend region may be displayed on the display according to the application being controlled.

In a third method, the region may be activated when the application is executed.

That is, when the user bumps the user terminal 1210 on the other user terminal while touching the activated region, the user terminal 1210 may sense the bumping motion and send the friend request to the SNS providing system 1220. The other user terminal may also activate a region on a display of the other user terminal according to control of an application installed in the other user, and when a user of the other user terminal bumps the other user terminal on the user terminal 1210 while touching the activated region, the other user terminal may sense the bumping motion and send a friend request to the SNS providing system 1220.

Here, the server, the SNS providing system 1220, may set a relationship between the users of the user terminal 1210 and the other user terminal based on the friend request and the friend request from the other user terminal. Further, when the relationship is set, the user terminal 1210 may send user information on the user to the SNS providing system 1220 or receive user information on the other user terminal from the SNS providing system 1220. In this case, the user information on the user sent to the SNS providing system 1220 may be sent to the other user terminal through the SNS providing system 1220. In other words, when the relationship between the users is established, the user information, such as a user profile, may be exchanged between the user terminals.

In operation 1330, the SNS providing system 1220 receives a friend request from each of the user terminal 1210 that is a first user terminal and the other user terminal that is a second user terminal. Here, as described above, the friend request may be made through a bumping motion of the first user terminal and the second user terminal. In detail, the friend request may be made by bumping the first user terminal and the second user terminal while a first preset region on the display of the first user terminal and a second preset region on the display of the second user are touched.

Here, the first region and the second region may be activated by at least one of the foregoing three methods.

That is, in the first method, the first region may be activated by a first application when an add friend mode is set in the first application installed in the first user terminal, and the second region may be activated by a second application when an add friend mode is set in the second application installed in the second user terminal.

In the second method, the first region and the second region may be activated when add friend regions displayed on the displays of the first user terminal and the second user terminal respectively, are touched. Here, the add friend regions may be displayed on the displays through control of applications respectively installed in the first user terminal and the second user terminal.

In the third method, the first region and the second region may be activated when applications respectively installed in the first user terminal and the second user terminal are executed.

In operation 1340, the SNS providing system 1220 sets a relationship between the users of the first user terminal and the second user terminal. For example, the relationship setting unit 1222 may store the user information on the first user terminal and the user information on the second user terminal in association with each other, thereby setting the relationship.

Further, the SNS providing system 1220 may further include a user information provision unit (not shown) to provide the user information on the second user terminal to the first user terminal or provide the user information on the first user terminal to the second user terminal when the relationship is set. That is, when the relationship is established between the users, the user information, such as a user profile, may be exchanged between the user terminals.

Thus, the users may hold the user terminals in a manner similar to holding business cards to be exchanged and simply bump the user terminals while a particular region is touched, thereby building a personal connection between the users, for example, a friendship.

As described above, according to exemplary embodiments of the present invention, when one user makes a friend request to other users allowing location information to be shared, locations of the other users around the user are displayed on a user terminal of the user, and the user selects information on a desired user among the displayed information on the other users and registers the desired user as a friend, thereby building a personal connection between the users, for example, a friendship, through a simple process of request and selection.

Further, users making a friend request through respective user terminals within a preset distance provide information to one another, and one user selects information on a desired user among the provided information on the other users and registers the user as a friend, thereby building a personal connection between the users, for example, a friendship, through a simple process of request and selection.

In addition, users may hold user terminals in a manner similar to holding business cards to be exchanged and simply bump the user terminals while a particular region is touched, thereby building a personal connection between the users, for example, a friendship.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. A computer-readable recording medium may execute sensing a motion of bumping a user terminal and at least one other user terminal; sending a friend request to a server based on a sensing result, and setting a relationship between the user and the at least one other user based on the friend request from the user terminal and the friend request from the at least one other user terminal As described above, according to exemplary embodiments of the present invention, when one user makes a friend request to other users allowing location information to be shared, locations of the other users around the user are displayed on a user terminal of the user, and the user selects information on a desired user among the displayed information on the other users and registers the desired user as a friend, thereby building a personal connection between the users like a friend through a simple process of request and selection.

Further, users making a friend request through respective user terminals within a preset distance provide information to one another, and one user selects information on a desired user among the provided information on the other users and registers the user as a friend, thereby building a personal connection between the users, for example, a friendship through a simple process of request and selection.

In addition, users may hold user terminals in a manner similar to holding business cards to be exchanged and simply bump the user terminals while a particular region is touched, thereby building a personal connection between the users, for example, a friendship.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A user terminal connected to a system to provide social network service (SNS) comprising:
  a hardware processor, and
  a memory containing instructions that cause the processor to execute a process including:
  sending a friend request for initiating a communication within the SNS and location information of the user terminal of a first user having an application for the communication, and receiving user information of at least one other user terminals of at least one second users, said at least one other user terminals having the same application as the first user, and
  controlling a display of the user terminal to display a current location of the first user and the user information of the at least one of the second users present within a predetermined distance based on received location information of the other user terminal,
  wherein, within the display, a particular region of the display is set as a current location of the user terminal,
  wherein, the process further includes displaying the user information of the at least one of the second users as a friend to which the first user can communicate within the SNS when the user information of the at least one of the second users is selected in the user terminal,
  wherein the display is configured to display a map that shows locations of the at least one other user terminal, and wherein the display is configured to rotate an indication line so as to function as a radar system and sequentially display the at least one other user terminal as the indication line is rotated.

2. The user terminal of claim 1, wherein the display is configured to change a scale of the map according to an operation of the user.

3. The user terminal of claim 1, wherein the process further includes controlling the display so that the longer the distance is, the farther a location, in which the user information is displayed, is from the particular region.

4. The user terminal of claim 1, wherein the process further includes sending user information selected by the user among the displayed user information.

5. A method performed by a user terminal to provide social network service (SNS), said method including the steps of:
  sending the friend request for initiating a communication within the SNS and location information of terminal of a first user having an application for the communication to the system and receiving user information of at least one other user terminals of at least one second users, said at least one other user terminals having the same application as the first user, and
  controlling a display of the user terminal to display a current location of the first user and the user information of the at least one of the second users present within a predetermined distance based on received location information of the other user terminal, the controlling further controlling the display so that a particular region of the display is set as a current location of the user terminal,
  controlling the display to display the user information of the at least one of the second users as a friend to which the first user can communicate within the SNS when the user information of the at least one of the second users is selected in the user terminal,
  displaying a map that shows locations of the at least one other user terminal, and
  rotating an indication line so as to function as a radar system and sequentially displaying the at least one other user terminal as the indication line is rotated.

6. The method of claim 5, further including changing a scale of the map according to an operation of the user.

7. The method of claim 5, further including controlling the display so that the longer the distance is, the farther a location; in which the user information is displayed, is from the particular region.

8. The method of claim 5, further including sending user information selected by the user among the displayed user information.

9. A non-transitory computer-readable recording medium storing an executable program to perform a method performed by a user terminal to provide social network service (SNS), said method including the steps of:
  sending the friend request for initiating a communication within the SNS and location information of terminal of a first user having an application for the communication to the system and receiving user information of at least one other user terminals of at least one second users, said at least one other user terminals having the same application as the first user,
  controlling a display of the user terminal to display a current location of the first user and the user information of the at least one of the second users present within a predetermined distance based on received location information of the other user terminal, the controlling further controlling to display so that a particular region of a display of the user terminal that is set as a current location of the user terminal,
  controlling the display to display the user information of the at least one of the second users as a friend to which the first user can communicate within the SNS when the user information of the at least one of the second users is selected in the user terminal,
  displaying a map that shows locations of the at least one other user terminal, and
  rotating an indication line so as to function as a radar system and sequentially displaying the at least one other user terminal as the indication line is rotated.

10. The non-transitory computer-readable recording medium of claim 9, wherein the method further includes changing a scale of the map according to an operation of the user.

11. The non-transitory computer-readable recording medium of claim 9, wherein the method further includes controlling the display so that the longer the distance is, the farther a location, in which the user information is displayed, is from the particular region.

12. The non-transitory computer-readable recording medium of claim 9, wherein the method further includes sending user information selected by the user among the displayed user information.

13. A server device connected to a plurality of user terminals to provide social network service (SNS) comprising:
- a storage;
- a hardware processor and
- a memory containing instructions that cause the processor to execute a process including:
- receiving location information of a user terminal of a first user which has an application for communication and allows the location information to be shared in response to a friend request for initiating a communication within the SNS from at least one other user terminals of at least one second users, said at least one other user terminals having the same application as the first user;
- identifying at least one of the second users present within a predetermined distance based on the location information of the user terminal of the first user having an application for the communication and location information of the other user terminal that is allowed to be shared;
- identifying and sending the user information of the other user terminal to the user terminal; and
- setting a relationship between the first user and the at least one of the second users as a friend to which the first user can communicate within the SNS when the user information of the at least one of the second users is selected in the user terminal,
- wherein the process further includes sending the user information so that a display of the user terminal displays a map that shows locations of the at least one other user terminal, and
- wherein the process further includes sending the user information so that the display rotates an indication line so as to function as a radar system and sequentially displays the at least one other user terminal as the indication line is rotated.

14. The server device of claim 13, wherein the process further includes sending the user information so that the display changes a scale of the map according to an operation of the user.

15. The server device of claim 13, wherein the process further includes sending the user information so that a display of the user terminal displays so that the longer the distance is, the farther a location, in which the user information is displayed, is from the particular region.

16. The server device of claim 13, wherein the process further includes receiving user information selected by the user among the displayed user information.

17. A method performed by a server device connected to a plurality of user terminals to provide social network service (SNS), said method including the steps of:
- storing, by the server device, location information of the user terminal;
- receiving, by the server device, location information of the user terminal of a first user which has an application for communication and allows the location information to be shared in response to a friend request for initiating a communication within the SNS from at least one other user terminals of at least one second users, said at least one other user terminals having the same application as the first user;
- identifying, by the server device, at least one of the second users present within a predetermined distance based on the location information of the user terminal of the first user having an application for the communication and location information of the other user terminal that is allowed to be shared;
- identifying and sending, by the server device, the user information of the other user terminal to the user terminal;
- setting, by the server device, a relationship between the first user and the at least one of the second users as a friend to which the first user can communicate within the SNS when the user information of the at least one of the second users is selected in the user terminal,
- displaying, in a display of the user terminal, a map that shows locations of the at least one second user other user terminal, and
- rotating an indication line so as to function as a radar system and sequentially displaying the at least one other user terminal as the indication line is rotated.

18. The method of claim 17, further including changing a scale of the map according to an operation of the user.

19. The method of claim 17, further including sending, by the server device, the user information so that a display of the user terminal displays so that the longer the distance is, the farther a location, in which the user information is displayed, is from the particular region.

20. The method of claim 17, further including receiving, by the server device, user information selected by the user among the displayed user information.

21. A non-transitory computer-readable recording medium storing an executable program to perform a method performed by a server device connected to a plurality of user terminals to provide social network service (SNS), said method including the steps of:
- storing, by the server device, location information of the user terminal;
- receiving, by the server device, location information of the user terminal of a first user which has an application for communication and allows the location information to be shared in response to a friend request for initiating a communication within the SNS from at least one other user terminals of at least one second users, said at least one other user terminals having the same application as the first user;
- identifying, by the server device, at least one of the second users present within a predetermined distance based on the location information of the user terminal of the first user having an application for the communication and location information of the other user terminal that is allowed to be shared;
- identifying and sending, by the server device, the user information of the other user terminal to the user terminal; and
- setting, by the server device, a relationship between the first user and the at least one of the second users as a friend to which the first user can communicate within the SNS when the user information of the at least one of the second users is selected in the user terminal,
- wherein the method further includes displaying, in a display of the user terminal, a map that shows locations of the at least one other user terminal, and
- wherein the method further includes rotating an indication line so as to function as a radar system and sequentially displaying the at least one other user terminal as the indication line is rotated.

22. The non-transitory computer-readable recording medium of claim 21, wherein the method further includes changing a scale of the map according to an operation of the user.

23. The non-transitory computer-readable recording medium of claim 21, wherein the method further includes sending, by the server device, the user information so that a display of the user terminal displays so that the longer the distance is, the farther a location, in which the user information is displayed, is from the particular region.

24. The non-transitory computer-readable recording medium of claim 21, wherein the method further includes receiving, by the server device, user information selected by the user among the displayed user information.

* * * * *